United States Patent
Caldwell et al.

(10) Patent No.: US 6,316,535 B1
(45) Date of Patent: Nov. 13, 2001

(54) COATING SYSTEM AND METHOD OF APPLYING THE SAME

(75) Inventors: Kenneth G. Caldwell, Mountville; Raymond H. Fernando, Allentown; Vijaya K. Pidugu, Columbia, all of PA (US)

(73) Assignee: Armstrong World Industries, Inc., Lancaster, PA (US)

( * ) Notice: Subject to any disclaimer, the term of this patent is extended or adjusted under 35 U.S.C. 154(b) by 0 days.

(21) Appl. No.: 09/313,627

(22) Filed: May 18, 1999

(51) Int. Cl.$^7$ .............................. C08K 3/26; C08L 75/02; C08L 75/04
(52) U.S. Cl. .................. 524/425; 524/507; 524/538; 524/539; 524/588; 524/590; 524/591; 524/788; 524/839; 524/871; 525/123; 525/440; 525/457; 525/474; 525/478; 525/54.22; 525/54.3; 525/455; 156/331.4
(58) Field of Search ............................ 524/425, 507, 524/538, 539, 588, 590, 591, 788, 839, 871; 525/123, 440, 457, 474, 478, 54.22, 54.3, 455; 156/331.4

(56) References Cited

U.S. PATENT DOCUMENTS

| | | | |
|---|---|---|---|
| 3,669,896 | * 6/1972 | Preininger et al. ............... 106/448 |
| 3,775,377 | 11/1973 | Kokawa et al. .................. 525/126 |
| 3,856,741 | * 12/1974 | Lovell et al. .................... 524/788 |
| 3,929,929 | 12/1975 | Kuehn ........................... 525/450 |
| 3,954,587 | 5/1976 | Kokawa .......................... 204/478 |
| 4,019,972 | 4/1977 | Faust ............................. 428/457 |
| 4,034,017 | 7/1977 | Chang et al. .................... 525/440 |
| 4,138,299 | 2/1979 | Bolgiano ......................... 428/47 |
| 4,153,778 | 5/1979 | Park et al. ....................... 528/76 |
| 4,254,230 | 3/1981 | Howard .......................... 525/28 |
| 4,342,793 | 8/1982 | Skinner et al. ................... 427/44 |
| 4,386,965 | * 6/1983 | Fringeli et al. .................. 524/100 |
| 4,387,139 | 6/1983 | Herwig et al. ................... 428/423.7 |
| 4,421,782 | 12/1983 | Bolgiano et al. ................. 427/53.1 |
| 4,430,486 | 2/1984 | Chang et al. .................... 525/44 |
| 4,497,932 | 2/1985 | Trovati .......................... 524/591 |
| 4,525,103 | * 6/1985 | Meyer et al. .................... 166/261 |
| 4,717,740 | 1/1988 | Hung et al. ..................... 522/96 |
| 4,870,152 | 9/1989 | Meixner et al. .................. 528/49 |
| 5,003,026 | 3/1991 | Ehrhart et al. ................... 528/49 |
| 5,089,376 | 2/1992 | Setthachayanon ................ 430/284 |
| 5,290,902 | 3/1994 | Jacobs et al. .................... 528/49 |
| 5,326,812 | * 7/1994 | Diener et al. .................... 524/507 |
| 5,334,673 | * 8/1994 | Wu ............................... 824/875 |
| 5,461,109 | * 10/1995 | Blair et al. ..................... 524/839 |
| 5,719,227 | 2/1998 | Rosenberry et al. .............. 524/590 |
| 5,766,097 | * 6/1998 | Horiuchi et al. ................. 524/445 |
| 5,830,938 | * 11/1998 | St. Laurent et al. .............. 524/590 |
| 5,843,576 | 12/1998 | Rosenberry et al. .............. 428/423.1 |
| 5,967,906 | * 10/1999 | Horiuchi et al. ................. 524/445 |
| 6,011,106 | * 1/2000 | de la Cuesta Sheppard ........ 524/507 |

FOREIGN PATENT DOCUMENTS

| | | | |
|---|---|---|---|
| 0 167 188 | 1/1985 | (EP) | L08F/283/00 |
| J6 1168-610-A | 1/1985 | (JP) . | |

OTHER PUBLICATIONS

The Chemistry of Polyurethane Coatings, A General Reference Manual, Published by Bayer Corporation, Copyright © 1997 Bayer Corp., complete publication (pp. 1–20).

* cited by examiner

Primary Examiner—Peter Szekely
(74) Attorney, Agent, or Firm—Womble Carlyle Sandridge & Rice PLLC

(57) ABSTRACT

An aqueous, two component system for coating a substrate includes either a filler incorporated in both components prior to combining the components or an elevated amount of a filler, such as 50% by dry volume, in either component. The filler is preferably calcium carbonate, but may also be selected from titanium dioxide, sand, clay, mica, dolomite, silica, talc, perlite, gypsum, wallastonite, aluminum trihydrate, zinc oxide, barium sulfate, zinc sulfate, and combinations thereof. The first component includes a first polymer containing hydroxyl functional groups or amine functional groups and, optionally, a catalyst, preferably an organotin catalyst. The first polymer is selected from a polyester polyol, an acrylic polyol, a urethane polyol, a polyether polyol, a polyamine, an aldimine, a short oil alkyd, a silicone polyol, a cellulose ester, a vinyl polyol, and combinations thereof and preferably is a polyaspartic ester. The second component includes a second polymer which is polyisocyanate containing isocyanate functional groups. The coating can be applied by applying to the substrate the first component then separately applying the second component shortly thereafter. Alternatively, the components can first be mixed then applied to the substrate as a mixture.

20 Claims, No Drawings

COATING SYSTEM AND METHOD OF APPLYING THE SAME

FIELD OF THE INVENTION

The present invention relates generally to coating compositions, and more specifically to filled water-based polymeric coating compositions for substrates, such as mineral fiber boards.

BACKGROUND OF THE INVENTION

Aqueous coating compositions for substrates, such as mineral fiber boards, are becoming increasingly important for both economic and ecological reasons. It is desirable to reduce the use of volatile organic solvents, which can be harmful, resulting in an increased desire for waterborne (i.e., water-based) mixtures. There are, however, some disadvantages associated with the use of waterborne mixtures.

Disadvantages of aqueous solutions include the difficulty, in some cases, of effecting sufficient water dispersibility and solubility of the binder components of the coating composition in water. Where good dispersibility and solubility are achieved, one often encounters lowered resistance of the cured coatings to water. This is less of a problem with coating compositions that are soluble only in organic solvents. In addition, there are processing problems that result from the high viscosity of aqueous coating compositions. These problems have, in some situations, previously been overcome through the use of organic auxiliary solvents in conjunction with water. The use of these auxiliary solvents, however, dampens the economic and ecological advantages of using water in the first place.

One solution, at least as it pertains to coating mineral fiber boards, involves the use of one component waterborne, latex-based coatings. These coatings are based on waterborne latex polymers or polymer solutions including ethylene vinyl chloride, vinyl acrylic, starch, or melamine formaldehyde. Such coatings are either self-crosslinking or coalesce upon drying by use of ovens. Mineral fiber boards are typically used as ceiling tiles and serve to improve thermal and acoustic insulation.

Similarly, two component systems use crosslinking to achieve rapid curing at room temperature without the use of ovens. These two component systems, however, often take up to several hours to cure. Such a limitation on manufacturing and production methods is undesirable, and reduced processing times would be beneficial in many instances.

SUMMARY OF THE INVENTION

The present invention provides an aqueous system for coating a substrate. The system comprises two components. The first component contains a first polymer which has hydroxyl functional groups or amine functional groups and optionally a catalyst, preferably an organotin catalyst. The second component comprises a second polymer which is a polyisocyanate containing isocyanate functional groups. A filler (i.e., an extender pigment) is included in either the first component, second component, or both components. Preferably, at least one filler is incorporated in both the first component and the second component. Alternatively, the filler may only be present in one component. In the latter case the filler is present in an amount above about 50% by dry volume.

Preferably, the filler is selected from calcium carbonate, titanium dioxide, sand, clay, mica, dolomite, silica, talc, perlite, gypsum, wallastonite, aluminum trihydrate, zinc oxide, barium sulfate, zinc sulfate, and combinations thereof. The polymer of the first component is preferably selected from a polyester polyol, an acrylic polyol, a urethane polyol, a polyether polyol, a polyamine, an aldimine, a short oil alkyd, a silicone polyol, a cellulose ester, a vinyl polyol, and combinations thereof. A preferred polyamine is a polyaspartic ester.

The present invention also provides methods of coating a substrate. According to one embodiment, the method comprises the steps of applying to the substrate a first component which contains the first polymer containing hydroxyl functional groups or amine functional groups and optionally a catalyst to form a partially coated substrate. Then, a second component which contains a second polymer (which is a polyisocyanate containing isocyanate functional groups) is applied to the partially coated substrate. In another method, the second component is applied to the substrate first. Alternatively, the two components can first be mixed and the mixture applied to the substrate. Regardless of the particular method, at least one filler is preferably incorporated in both the first component and the second component. Alternatively, the filler may only be present in one component. In the latter case, the filler is present at an amount above about 50% by dry volume.

A third aspect to the present invention is the coating formed by applying to the substrate a coating system of the present invention using the methods of the present invention.

It is to be understood that both the foregoing general description and the following detailed description are exemplary, but are not restrictive, of the invention.

DETAILED DESCRIPTION OF THE INVENTION

The present invention is an aqueous system for coating a substrate. The system comprises two components. The first component contains a first polymer which has hydroxyl functional groups or amine functional groups and optionally a catalyst. The second component comprises a second polymer which is a polyisocyanate containing isocyanate functional groups. Preferably, at least one filler is incorporated in both the first component and the second component. Alternatively, the filler may only be present in one component. In the latter case, the filler is present at an amount above about 50% by dry volume of that component.

The two polymer components serve as binders in known ways. For example, when the first polymer includes hydroxyl groups, the hydroxyl groups react with the isocyanate groups to form urethane groups in a crosslinked polymer. Similarly, when the first polymer includes amine groups, the amine groups react with the isocyanate groups to form urea groups in a crosslinked polymer. The first polymer can be any known compatible polymer, capable of being dispersed or dissolved in water, having hydroxyl groups or amine groups used to react with polyisocyanate to form a crosslinked polymer. For example, the first polymer may be selected from, but not limited to, a polyester polyol, an acrylic polyol, a urethane polyol, a polyamine, an aldimine, a short oil alkyd, a silicone polyol, a cellulose ester, or a vinyl polyol. A preferred formula includes the use of a polyester polyol in the first component and a polyisocyanate in the second component.

It is important that the polymers contain minimum concentration of hydroxyl or amine functionality for sufficient cross-linking to occur. A preferred equivalent ratio of isocyanate functional groups to hydroxyl or amine functional groups is in the range of about 0.1:1 to about 10:1. A more preferred equivalent ratio of isocyanate functional groups to hydroxyl or amine functional groups is in the range of about 0.5:1 to about 5:1.

The catalyst can preferably be an organo-metallic catalyst used to speed the overall curing rate. Catalysts are, of course, used in an effective amount to speed the overall curing rate. One suitable catalyst can be any long chain tertiary amine. Preferred catalysts include dibutyl-tin-laurate and zinc octoate.

In the embodiment in which at least one filler is incorporated in both components, the filler may be a mixture or a single ingredient in both components; the fillers may also be the same or different in each component. A filler can be selected from the group consisting of calcium carbonate, titanium dioxide, sand, clay, mica, dolomite, silica, talc, perlite, gypsum, limestone, wallastonite, calcite, aluminum trihydrate, zinc oxide, barium sulfate, zinc sulfate and mixtures thereof. Preferably, calcium carbonate is used, and it may either be prepared synthetically or derived from natural sources, such as from limestone or calcite. Mixtures of filler in each component will also work. In this embodiment, the fillers should be included in both components in an amount of at least about 40% by dry volume of the total system after the two components are mixed or applied. Preferably, each component contains at least about 40% filler by dry volume. Still more preferably, the total system (or both components individually) contain the filler in an amount of at least about 75% (and most preferably at least about 90%) by dry volume.

If the filler is only present in one of the two components prior to mixing, the filler should be present in an amount of at least about 50% by dry volume of that component, with slightly higher preferable concentrations of at least about 85% and, most preferably, at least about 95% by dry volume. The concentrations are slightly higher for this embodiment because the filler is added to only one component.

The coating composition of the present invention provides a highly accelerated cure time as compared to aqueous materials known in the prior art. As defined herein, the term "cure time" shall mean the time from applying either the mixture of the two components or the second of the two components until the coating is cured at ambient conditions. Curing is evidenced by a surface which is dry to the touch and is tack free. Cure times as low as about 5 minutes can be realized according to the present invention. Preferably, cure times as low as (or less than) about 2 minutes are achievable. Most preferably, cure times as low as (and less than) about 10 seconds are achieved. Such a short time provides advantages in manufacturing and production.

The inventors believe that the improved cure times are a result of the adsorption of the active polymers of each component onto the surface of the filler (referred to as an "extender pigment" in the coating industry). It is believed that the accelerated cure times are thus created by an increased polymer surface area within the system. The increased polymer surface area allows easier and more extensive contact between the two polymers and subsequently, the rate of crosslinking, and ultimately curing, is enhanced. It has been found that by incorporating a filler in each component individually prior to combining the two components (either just prior to application or on a substrate by sequential application), the coating cures much faster. Alternatively, by elevating the content of filler in one component, the curing rate is increased in this way.

Another way of determining the amount of filler which should be added is by adding a sufficient amount of filler to achieve a cure time at ambient conditions of less than about five minutes (preferably, ten seconds or less) after application of the mixture or second component. Of course, other factors are relevant to cure time, such as the particular polymers used, the catalyst used, the ratio of functional groups, and the water content, among others, but, assuming that one has already specified the particular polymers and catalysts, then the cure time can be decreased simply by increasing the amount of filler used (and/or decreasing the amount of water).

There are several commercially available materials which work well in the present invention. A preferred polyester polyol is Bayhydrol XP-7093, provided by Bayer Corporation. (BAYHYDROL XP-7093 is a registered trademark of Bayer Corporation for a waterborne polyester polyol at 30% solids.) A preferred polyisocyanate is Bayhydur XP-7063, also provided by Bayer Corporation. (BAYHYDUR XP 7063 is a registered trademark of Bayer Corporation for a polysocyanate.) A preferred organotin catalyst is provided by Elf Atochem and is known as Fascat 4224. (FASCAT is a registered trademark of Elf Atochem for dibutyl-tin-dilaurate. The calcium carbonate is provided, preferably, by a material known as Omya Hydrocarb 60. (OMYA HYDRO-CARB is a registered trademark of Pluess-Staufer for calcium carbonate.)

In addition to the above elements of each component, other additives may be employed. The system may also contain the known additives from coatings technology, such as softeners, high boiling liquids, UV stabilizers, anti-oxidants, microbiocides, algicides, dehydrators, thixotropic agents, wetting agents, flow enhancers, surfactants, matting agents, anti-slip agents, and aerators. The additives are chosen based on the requirements of the particular application and their compatibility with the necessary components as defined above, in a known manner.

In preparing the components of the present invention, the first component is prepared by simply mixing the filler, the first polymer, the catalyst (if present), and water. The second component is also prepared by simply mixing the filler, the second polymer, and water. Typically, the water comes from a calcium carbonate slurry.

As disclosed above, the invention also includes a method of coating a substrate. In one embodiment, the method comprises the steps of applying to the substrate a first component which contains a first polymer containing hydroxyl functional groups or amine functional groups and, optionally, a catalyst to form a partially coated substrate (i.e., coated with the first component). Then, a second component comprising a second polymer, the second polymer being a polyisocyanate containing isocyanate functional groups, is applied to the partially coated substrate. The second coating should be applied promptly (preferably immediately) after application of the first coating and before any significant drying of the first coating occurs. Each of these two components is an aqueous mixture and their ease of application provides an effective, easy, and fast-curing coating. A preferred application is to ceiling tiles, such as those made from mineral fiber board.

An alternative method is first separately preparing the first and second components of the present invention, then mixing the two components together, and then applying the mixture to the substrate. In this embodiment, it is important to promptly apply the mixture to the substrate almost immediately after mixing, since the mixture has a limited "pot life." In particular, the mixture tends to gel quickly after mixing the two components, due to the rapid rate of crosslinking.

Each of the two components, before they are mixed or applied, is in an aqueous bath. The water is typically present with the filler which is usually provided to the composition as a mixture. Additional water is provided through the polyol which is also typically an aqueous mixture.

The preferred method of application of the two components is to spray one component onto the substrate right before spraying the other. The order in which each component is sprayed is not critical. In such an application, the two components are mixed right on the substrate. Any overspray can be captured and recycled. This application does not require the use of a static mixer or the use of dual component spray guns. Alternatively, the first component could be applied with a roll coater or a curtain coater, followed by spraying the second component.

When the components are applied to a board (such as a mineral fiber board), as is the case in many ceiling tile applications, additional advantages are seen because the board itself absorbs (or wicks away) some of the water present in the system. The result of such water removal is accelerated contact between the polymers.

Other than mineral fiber boards, substrates which can be coated by the present invention include wood, wood composite, gypsum board, scrim, cloth, glass and metal.

The following examples provide specific information about certain applications of the present invention. These examples are not intended to limit the scope of the invention. Rather, they are intended to provide detailed information about certain aspects of the invention.

EXAMPLE 1

The mineral fiber board of this example was coated by spraying the first component onto the board and then spraying the second component onto the sprayed board. The coating dried in about 10 seconds.

First Component

| Ingredient | Brand Name | Weight % | Volume % | Manufacturer |
|---|---|---|---|---|
| Calcium Carbonate | Hydrocarb 60 Mixture | 66.10 | 52.90 | Omya Corp. |
| Organotin Catalyst | Fascat 4224 | 0.30 | 0.40 | Elf Atochem |
| Polyester Polyol | Bayhydrol XP-7093 | 33.6 | 46.7 | Bayer Corp. |

Second Component

| Ingredient | Brand Name | Weight % | Weight % | Manufacturer |
|---|---|---|---|---|
| Calcium Carbonate | Hydrocarb 60 Mixture | 92.85 | 88.42 | Omya Corp. |
| Polyiso-cyanate | Bayhydur XP-7063 | 7.15 | 11.58 | Bayer Corp. |

All weight and volume percentages in the tables are dry weight and volume percentages. The first and second components were combined in amounts to provide a 1:1 stoichiometric ratio of hydroxyl to isocyanate functional groups. The final solids were 67% with the balance being water. The water in the coating comes from the Calcium Carbonate aqueous mixture which is 73.5% solids and from the Polyester Polyol aqueous mixture which is 30% solids.

Fascat 4224 is an Organotin catalyst which helps provide a faster cure rate. The level of the catalyst can be used to control or modify the cure rate.

EXAMPLE 2

First Component

| Ingredient | Brand Name | Weight % | Volume % | Manufacturer |
|---|---|---|---|---|
| Calcium Carbonate | Hydrocarb 60 Mixture | 33.00 | 46.40 | Omya Corp. |
| Calcium Carbonate | Hydrocarb 60 Powder | 33.00 | 12.60 | Omya Corp. |
| Organotin Catalyst | Pascat 4224 | 0.30 | 0.40 | Elf Atochem |
| Polyester Polyol | Bayhydrol XP-7093 | 33.7 | 40.6 | Bayer Corp. |

Second Component

| Ingredient | Brand Name | Weight % | Volume % | Manufacturer |
|---|---|---|---|---|
| Calcium Carbonate | Hydrocarb 60 Mixture | 92.85 | 88.42 | Omta Corp. |
| Polyiso-cyanate | Bayhydur XP-7063 | 7.15 | 11.58 | Bayer Corp. |

This example is a higher solids formula of 71% solids.

EXAMPLE 3

In this example there was less residual water in the cured coating than was the case in the coating of Example 1.

First Component

| Ingredient | Brand Name | Weight % | Volume % | Manufacturer |
|---|---|---|---|---|
| Calcium Carbonate | Hydrocarb 60 Mixture | 90.74 | 83.0 | Omya Corp. |
| Aspartic Ester (poly-amine) | Desmophen NH 1220 | 9.26 | 17.01 | Bayer Corp. |

Second Component

| Ingredient | Brand Name | Weight % | Volume % | Manufacturer |
|---|---|---|---|---|
| Calcium Carbonate | Hydrocarb 60 Mixture | 90.34 | 82.32 | Omya Corp. |
| Polyiso-cyanate | Bayhydur XP-7063 | 9.66 | 17.68 | Bayer Corp. |

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:
1. An aqueous system for coating a substrate comprising:
   a first component which comprises a first polymer containing hydroxyl functional groups or amine functional groups and, optionally, a catalyst;

a second component which comprises a second polymer which is polyisocyanate containing isocyanate functional groups;

water; and at least one filler in a total combined filler amount of at least about 75% by dry volume and wherein said at least one filler is incorporated in either 1) the first component, 2) the second component, or 3) in both components, and said at least one filler incorporated in an amount sufficient to achieve a cure time at ambient conditions of less than about five minutes after application of said first component and said second component to said substrate.

2. The system of claim 1, wherein said at least one filler is selected from the group consisting of calcium carbonate, titanium dioxide, sand, clay, mica, dolomite, silica, talc, perlite, gypsum, wollastonite, aluminum trihydrate, zinc oxide, barium sulfate, zinc sulfate, and combinations thereof.

3. The system of claim 1, wherein the catalyst of the first component is present and is an organotin catalyst.

4. The system of claim 1, wherein said first polymer is selected from the group consisting of polyester polyol, acrylic polyol, urethane polyol, polyether polyol, polyamine, aldimine, short oil alkyd, silicone polyol, cellulose ester, vinyl polyol, and combinations thereof.

5. The system of claim 1, wherein:

said first component and said second component contain said at least one filler and water in amounts sufficient to achieve a cure time at ambient conditions of less than about two minutes after application of said first component and said second component to said substrate.

6. The system of claim 5, wherein said first component and said second component contain said at least one filler and water in amounts sufficient to achieve a cure time at ambient conditions of less than about ten seconds after application of said first component and said second component to said substrate.

7. The coating composition of claim 1, wherein, after combining said first component and said second component, said system contains said at least one filler in an amount of at least about 90% by dry volume.

8. The system of claim 1, wherein calcium carbonate is present as a filler.

9. The system of claim 1, wherein the equivalent ratio of isocyanate functional groups to hydroxyl functional groups is in the range of about 0.1:1 to about 10:1.

10. The system of claim 9, wherein the equivalent ratio of isocyanate functional groups to hydroxyl functional groups is in the range of about 0.5:1 to about 5:1.

11. The system of claim 1, wherein the equivalent ratio of isocyanate functional groups to amine functional groups is in the range of about 0.1:1 to about 10:1.

12. The system of claim 11, wherein the equivalent ratio of isocyanate functional groups to amine functional groups is in the range of about 0.5:1 to about5:1.

13. An aqueous coating composition comprising:

a first component which comprises calcium carbonate, water, and a first polymer containing hydroxyl functional groups or amine functional groups and, optionally, a catalyst; and a second component which comprises calcium carbonate, water, a second polymer which is polyisocyanate containing isocyanate functional groups, said first component and said second component contain calcium carbonate in an amount of at least 75% by dry volume and wherein said calcium carbonate and said water are present in amounts sufficient to achieve a cure time at ambient conditions of less than about five minutes after application of said first component and said second component to a substrate.

14. The coating composition of claim 13, wherein said first component and said second component contain in amounts sufficient to achieve a cure time of about ten seconds after application of said first component and said second component to said substrate.

15. The coating composition of claim 14, wherein, after combining said first component and said second component, said system contains calcium carbonate in an amount of at least about 90% by dry volume.

16. An aqueous system for coating a substrate comprising:

a first component which comprises a first polymer containing hydroxyl functional groups or amine functional groups, water, and, optionally, a catalyst; and a second component which comprises a second polymer which is polyisocyanate containing isocyanate functional groups and water;

wherein at least one filler is incorporated in one or both of said first component and said second component in an amount of at least about 75% by dry volume of each component, and said at least one filler and water are present in amounts sufficient to achieve a cure time at ambient conditions of less than about five minutes after application of said first component and said second component to said substrate.

17. The system of claim 16, wherein said at least one filler is selected from the group consisting of calcium carbonate, titanium dioxide, sand, clay, mica, dolomite, silica, talc, perlite, gypsum, wollastonite, aluminum trihydrate, zinc oxide, barium sulfate, zinc sulfate, and combinations thereof.

18. The system of claim 16, wherein said at least one filler is calcium carbonate, and said calcium carbonate is derived from at least one of limestone or calcite.

19. The system of claim 16, wherein said first polymer is selected from the group consisting of polyester polyol, acrylic polyol, urethane polyol, polyether polyol, polyamine, aldimine, short oil alkyd, silicone polyol, cellulose ester, vinyl polyol, and combinations thereof.

20. The system of claim 16, wherein said first component and said second component contain said at least one filler and water in amounts sufficient to achieve a cure time of less than about ten seconds after application of said first component and said second component to said substrate.

* * * * *

UNITED STATES PATENT AND TRADEMARK OFFICE
CERTIFICATE OF CORRECTION

PATENT NO. : 6,316,535 B1
DATED : November 13, 2001
INVENTOR(S) : Caldwell et al.

It is certified that error appears in the above-identified patent and that said Letters Patent is hereby corrected as shown below:

Column 6,
Line 14, in the table entitled "First Component," under the column "Brand Name," delete "Pascat" and insert -- Fascat --.
Line 25, in the table entitled "Second Component," under the column "Manufacturer" delete "Omta" and insert -- Omya --.

Column 8,
Line 15, after "contain" insert -- said calcium carbonate and water --.

Signed and Sealed this

Tenth Day of September, 2002

Attest:

Attesting Officer

JAMES E. ROGAN
Director of the United States Patent and Trademark Office